(No Model.)
B. W. GOODSELL & B. F. ELSON.
PACKING FOR PISTONS, JOURNAL BEARINGS, &c.
No. 329,160. Patented Oct. 27, 1885.
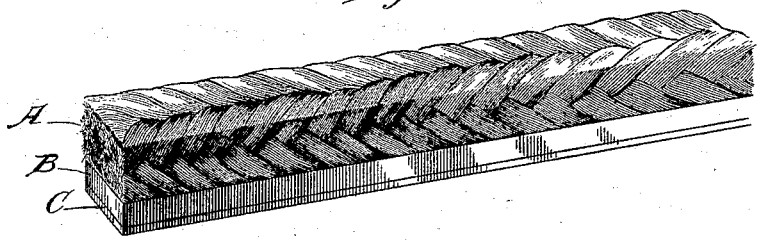
   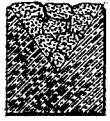
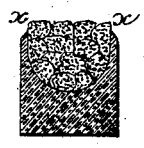
Witnesses.
Inventors
B. W. Goodsell and
B. F. Elson
By Jno. S. Elliott
Atty.

UNITED STATES PATENT OFFICE.

BYRON W. GOODSELL, OF CHICAGO, ILLINOIS, AND BENJAMIN F. ELSON, OF BOSTON, MASSACHUSETTS.

PACKING FOR PISTONS, JOURNAL-BEARINGS, &c.

SPECIFICATION forming part of Letters Patent No. 329,160, dated October 27, 1885.

Application filed March 17, 1884. Serial No. 124,434. (No model.)

*To all whom it may concern:*

Be it known that we, BYRON W. GOODSELL, residing in Chicago, county of Cook, and State of Illinois, and BENJAMIN F. ELSON, residing in Boston, county of Suffolk, and State of Massachusetts, both citizens of the United States, have invented certain new and useful Improvements in Packing for Pistons, Journal-Bearings, &c., of which the following is a specification.

This invention relates to improvements in packing provided with a yielding back for forming a close but yielding joint between a piston and cylinder, bearing and box, or between any two surfaces to which it may be applied, and for compensating for wear either in the packing itself or the surface against which it operates, or both.

The object of this invention is to produce in condition to be kept in stock and ready for use a packing having a rubber back and a plaited fibrous face secured together in a contiguous piece and in suitable lengths for immediate use. We attain these objects by devices illustrated in the accompanying drawings, in which—

Figure 1 represents a perspective view of a packing embodying our invention; Fig. 2, a transverse section of the same; Figs. 3, 4, and 5, a similar view of other forms of packing embodying our invention.

Similar letters of reference indicate the same parts in the several figures of the drawings.

In the preferred form of packing, as illustrated in Fig. 1, A represents a fibrous material of flax, hemp, or other desirable fiber, plaited in such a manner as to be substantially square in cross-section, so as to present, as nearly as may be, a flat surface on its upper and what in operation becomes its bearing face.

The object in plaiting the fiber is to better adapt it to retain its shape and present a greater area of contact-surface with the backing when the packing is formed in long strips for the purpose of winding it closely and concentrically or spirally around the bearing-surface of a journal, a reciprocating rod, or in one or more turns around a piston; but in this connection it may also be stated that when used upon a flat back, as in Fig. 1, the plaiting of the fiber increases its power to absorb and retain a lubricant, besides rendering the fiber stronger and more durable.

Secured to the fibrous material by its own adhesive nature, or by any other suitable adhesive material, or by stitching or metallic fastening devices, is a back, B, preferably composed of a solid rubber strip corresponding in width with the fibrous bearing-face; but this back may be composed of a series of layers of rubber combined with a textile fabric, or of any other material which will afford an elastic or yielding backing for the fibrous face of the packing.

The back B may or may not be, as desired, covered with cloth or other material C for protective purposes.

It is a well-known fact that any considerable contact of the rubber back of a packing with a bearing-surface is not only injurious to the rubber, but produces an objectionable friction on the bearing, and for these reasons alone the construction of packing shown in Figs. 1 and 2 is preferred. This result, however, may be obtained to perhaps a less insured degree by other forms of packing illustrated in Figs. 3, 4, and 5, in which the backing is provided with longitudinal grooves respectively square, V-shaped, and U-shaped in cross-section, so that suitable receptacles contiguous with the backing are formed for more effectively holding and confining the fibrous face, and for maintaining such a regularity in the sides of the packing that the strips when laid side by side will lie close together and form as a whole, as near as possible, a contiguous face and back—a desirable end to attain, for the reason that spaces in the packing of a piston or journal box are objectionable, as is well known.

Grooving the backing, as described, provides for the effective employment of a fibrous face composed of strands which may be laid in the grooves in parallel lines, or when twisted together in the form of rope, or filled in in a mass, though it is preferred that the fiber be in strands, plaited to the form of the grooves or twisted loosely and pressed therein, but in any case so as to project above the sides of the backing, so that when the strips are laid side by side the fibrous filling of the contiguous strips will join each other next their bearing-face by overlapping the edges of the sides of the backing.

Whether or not the fibrous facing is plaited, twisted, &c., it may have less thickness than that shown and described—as, for instance, instead of being square in cross-section, as shown in Fig. 1, it may be flat; but in any case it should be of a sufficient thickness to successfully absorb and retain a lubricant and protect the elastic backing from contact with the bearing to which the packing is secured.

It is also obvious that it would not be a departure from our invention to construct such a packing as we have described in a tubular form, or in sheets, as contradistinguished from the strips above described.

It is admitted that a plaited fibrous face has before our invention been first applied to a bearing before the application of a rubber back, which operation is not only difficult, but the packing when completed is necessarily not compact or durable, and permits the accumulation of oil between the fiber and the rubber backing, soon destroying the latter. Only skilled hands can apply such a packing, whereas ours may be better and more effectively applied by one having little or no skill in the application of packings to bearings, and, besides, is complete and ready for use, and constitutes a complete article of manufacture that can be kept in stock and sold in any length necessary for the particular purpose to which it is to be applied.

Having described our invention, what we claim, and desire to secure by Letters Patent, is—

As a new article of manufacture, a packing having a rubber back and a plaited fibrous face secured together to form one contiguous piece in suitable lengths for immediate use, substantially as described.

BYRON W. GOODSELL.
BENJAMIN F. ELSON.

Witnesses:
W. W. ELLIOTT,
JNO. G. ELLIOTT.